United States Patent
Gaither et al.

(10) Patent No.: US 11,670,984 B2
(45) Date of Patent: Jun. 6, 2023

(54) NON-CONTACT IN-WHEEL MOTOR WITH STEERING

(71) Applicant: TOYOTA MOTOR ENGINEERING & MANUFACTURING NORTH AMERICA, INC., Plano, TX (US)

(72) Inventors: Geoffrey D. Gaither, Brighton, MI (US); Samuel D. Koch, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 695 days.

(21) Appl. No.: 16/672,148

(22) Filed: Nov. 1, 2019

(65) Prior Publication Data

US 2021/0135511 A1 May 6, 2021

(51) Int. Cl.
*H02K 7/06* (2006.01)
*H02K 7/00* (2006.01)
*H02K 1/12* (2006.01)
*B60B 19/00* (2006.01)
*H02K 7/116* (2006.01)
*B60K 7/00* (2006.01)
*H02K 7/14* (2006.01)
*H02K 21/12* (2006.01)
*B62D 5/04* (2006.01)

(52) U.S. Cl.
CPC .......... *H02K 7/006* (2013.01); *B60B 19/006* (2013.01); *B60K 7/0007* (2013.01); *B62D 5/04* (2013.01); *H02K 1/12* (2013.01); *H02K 7/116* (2013.01); *H02K 7/14* (2013.01); *H02K 21/12* (2013.01); *Y02T 10/64* (2013.01)

(58) Field of Classification Search
CPC ...... B60B 19/006; B60K 7/0007; B62D 5/04; H02K 1/12; H02K 21/12; H02K 2213/09; H02K 7/006; H02K 7/116; H02K 7/14; Y02T 10/64
See application file for complete search history.

(56) References Cited

U.S. PATENT DOCUMENTS

2013/0264895 A1* 10/2013 Kondou ............... H02K 1/06
310/46
2017/0210220 A1* 7/2017 Wang ................ B60L 3/0061

FOREIGN PATENT DOCUMENTS

AU 2010231573 A1 * 9/2011 ............. B60K 7/00
DE 102010021781 12/2011
(Continued)

*Primary Examiner* — Naishadh N Desai
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for a drive mechanism of a vehicle, that may include: a rotor comprising a ring of a plurality of magnets located about a circumference of a rim of a wheel of the vehicle, the plurality of magnets generating a first magnetic field; a stator comprising a plurality of coils, the stator mounted to a body of the vehicle, and located outside a wheel of the vehicle and proximate to an outer edge of the ring of the plurality of magnets; and wherein the plurality of coils of the stator, when energized by an AC waveform, generate a second magnetic field stator, and further wherein an interaction between the first and second magnetic fields creates an attractive force causing tractive motion of the wheel about an axis of rotation of the wheel.

26 Claims, 7 Drawing Sheets

(56) References Cited

FOREIGN PATENT DOCUMENTS

| FR | 3021910 A1 | * | 12/2015 | ........... B60K 7/0007 |
| JP | 2006187189 A | * | 7/2006 | ........... B60L 15/007 |
| WO | WO-2008095601 A1 | * | 8/2008 | ........... B60K 17/046 |
| WO | WO-2010113115 A2 | * | 10/2010 | ............... B60K 7/00 |
| WO | 2014191167 | | 12/2014 | |

* cited by examiner

NON-CONTACT IN-WHEEL MOTOR WITH STEERING

TECHNICAL FIELD

The present disclosure relates generally to vehicle steering systems, and in particular, some implementations may relate to a non-contact traction device with magnetic steering.

DESCRIPTION OF RELATED ART

In-wheel motor drives have been explored for some time as an alternative to conventional mechanical drive assemblies and are often considered to be very attractive for electric vehicles (EVs). Some in wheel motors have been implemented to eliminate a mechanical gear transmission between the electric motor of the EV and the wheel.

Such systems have appeared attractive because they have the potential to eliminate the vehicle driveshaft, differential and other components. However, in-wheel motors can increase un-sprung mass, which can adversely impact suspension dynamics and response. In wheel motors can also suffer from poor cooling performance and durability challenges. Additionally, sending three-phase wiring to the wheel through the suspension can make for difficult and overly complex and expensive packaging.

BRIEF SUMMARY OF THE DISCLOSURE

According to various embodiments of the disclosed technology and novel configuration of an in-wheel motor separates the stator from the rotor and relocates the stator outside of the wheel while keeping the rotor in the wheel. This can be configured to remove a large amount of un-sprung mass by moving motor components outside of the wheel hub.

According to further embodiments, the stator can be configured to rotate about a perpendicular axis (perpendicular to normal vehicle motion) to enable steering. Mounting the stator coils on a circular, semicircular or other rotatable plate, or mounting them on an alternative rotatable structure allows them to be rotated about the perpendicular axis, which is substantially normal to the axis of rotation of the wheel. Because of the magnetic attraction between the energized stator coils and the magnets of the rotor, rotation of the stator coils causes the wheel magnets to follow this curvature of rotation, causing the wheel to rotate about this perpendicular axis, steering the vehicle.

In a more mechanical embodiment, stator coils may be replaced by a mechanical drive pinion gear configured to engage a corresponding bevel gear positioned about the circumference of the wheel rim. Rotating the drive pinion about its own axis causes counter rotation in the driven ring gear on the wheel rim causing the wheel to rotate about its own axis and providing tractive motion for the vehicle. Rotating the drive pinion gear about a perpendicular axis causes the wheel and tire to be rotated for steering.

In some embodiments, a drive mechanism of a vehicle, may include: a rotor comprising a ring of a plurality of magnets located about a circumference of a rim of a wheel of the vehicle, the plurality of magnets generating a first magnetic field; a stator comprising a plurality of coils, the stator mounted to a body of the vehicle, and located outside a wheel of the vehicle and proximate to an outer edge of the ring of the plurality of magnets; and In some embodiments, the plurality of coils of the stator, when energized by an AC waveform, generate a second magnetic field stator, and further In some embodiments, an interaction between the first and second magnetic fields creates an attractive force causing tractive motion of the wheel about an axis of rotation of the wheel. In some embodiments, the coils of the stator may be arranged radially about and rotatable in a plane perpendicular to the plane of rotation of the wheel.

Rotation of the stator in some embodiments may cause rotation of the wheel about an axis perpendicular to a road surface on which the wheel may be traveling.

The second magnetic field generated by coils of the stator at end portions of the stator may be stronger than the second magnetic field generated by coils of the stator at a center portion of the stator. For a given rotational orientation of the wheel, each set of coils may be aligned with a corresponding magnet of the rotor at a determined distance and the strength of the second magnetic field generated by a coil in a set of coils may be of a magnitude at least strong enough to cause sufficient attraction of its corresponding magnet to cause the attractive forces to contribute to rotational movement of the wheel.

In further embodiments: the stator may be mounted above the wheel of the vehicle in a wheel well of the vehicle and the coils of the stator may be disposed radially on a mounting member in sets of two or more coils; the drive mechanism may also include a rotatable shaft coupled to engage the mounting member such that rotation of the rotatable shaft causes rotation of the mounting member and the coils disposed thereon about a first axis perpendicular to the axis of rotation of the wheel; and rotation of the coils about the axis perpendicular to the axis of rotation of the wheel translates the second magnetic field rotationally and magnetic forces of attraction between the rotationally translated second magnetic field of the coils and the first magnetic field of the magnets induces rotational translation of the wheel about a second axis perpendicular to the axis of rotation of the wheel to steer the vehicle.

The coils of the stator may include a plurality of adjacent sets of three-phase AC windings and the magnets of the rotor may be arranged this alternating north/south pole permanent magnets.

For a given rotational orientation of the wheel, each set of coils may be aligned with a corresponding magnet of the rotor at a determined distance and the strength of the second magnetic field generated by a coil in a set of coils may be of a magnitude at least strong enough to cause sufficient attraction of its corresponding magnet to cause the attractive forces to contribute to rotational movement of the wheel.

In some embodiments, the stator may be mounted in the wheel well above the wheel of the vehicle, in front of the wheel of the vehicle or behind the wheel of the vehicle.

The drive mechanism may also include a DC power source and an inverter, the inverter may have an input coupled to the DC power source and an output coupled to the stator. In some embodiments, the inverter may be configured to convert a DC waveform from the DC power source into an AC waveform to drive the coils of the stator.

The drive mechanism may include a controller to control at least one of the phase, frequency and magnitude of the AC waveform.

In another embodiment, a drive mechanism of a vehicle, may include: a pinion gear mounted to a body of the vehicle, and located proximate to but outside a wheel hub of a wheel of the vehicle; and a bevel gear located within the wheel hub and around a circumference of a rim of the wheel of the vehicle, the bevel gear operatively meshing with the pinion gear such that rotation of the pinion gear causes a counter-rotation of the bevel gear which in turn causes tractive motion of the wheel about an axis of rotation of the wheel. The pinion gear may be mounted on a mounting member configured to cause the pinion gear to rotate about an axis perpendicular to the axis of rotation of the wheel, such that when the pinion gear rotates about the axis perpendicular to the axis of rotation of the wheel, meshing of the pinion gear with the bevel gear causes the wheel of the vehicle to be rotated about an axis perpendicular to the axis of rotation of the wheel to steer the vehicle.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can provide an in-wheel motor having a stator and a rotor configured such that the stator is positioned outside of the wheel, separate from the rotor, which remains in the wheel. In such a configuration, embodiments may be configured such that components, including stator coils (e.g. copper windings, etc.), Stator mounting hardware, inverters, energizing wiring and so on are placed outside of the un-sprung position on the vehicle. Positioning this mass outside of the un-sprung position can improve a vehicle's performance in some respects. Particularly, reducing un-sprung mass can lead to higher and more constant grip over uneven or irregular (e.g. bumpy) road surfaces.

An external stator can be part of an assembly that is configured to rotate about a perpendicular axis (e.g., perpendicular to forward vehicle motion) to enable steering. In some embodiments, the stator coils can be mounted on a rotatable plate or other mounting structure that when rotated causes the stator coils to rotate as well. Such a mounting structure can include a circular, semicircular or other rotatable plate. Mounting the stator coils on an rotatable structure allows the coils to be rotated about the perpendicular axis, which is substantially normal to the axis of rotation of the wheel. Magnetic attraction between the energized stator coils and the magnets of the rotor (e.g., mounted about the circumference of the wheel), rotation of the stator coils causes the wheel magnets to follow this curvature of rotation, causing the wheel to rotate about this perpendicular axis—i.e., turning the wheels. This can be used to steer the vehicle by this wheel rotation.

Mechanical embodiments may also be implemented. For example, stator coils may be replaced by a mechanical drive pinion gear configured to engage a corresponding bevel gear positioned about the circumference of the wheel rim. Rotating the drive pinion about its own axis causes counter rotation in the driven ring gear on the wheel rim causing the wheel to rotate about its own axis and providing tractive motion for the vehicle. Rotating the drive pinion gear about a perpendicular axis causes the wheel and tire to be rotated for steering.

Figure 1:
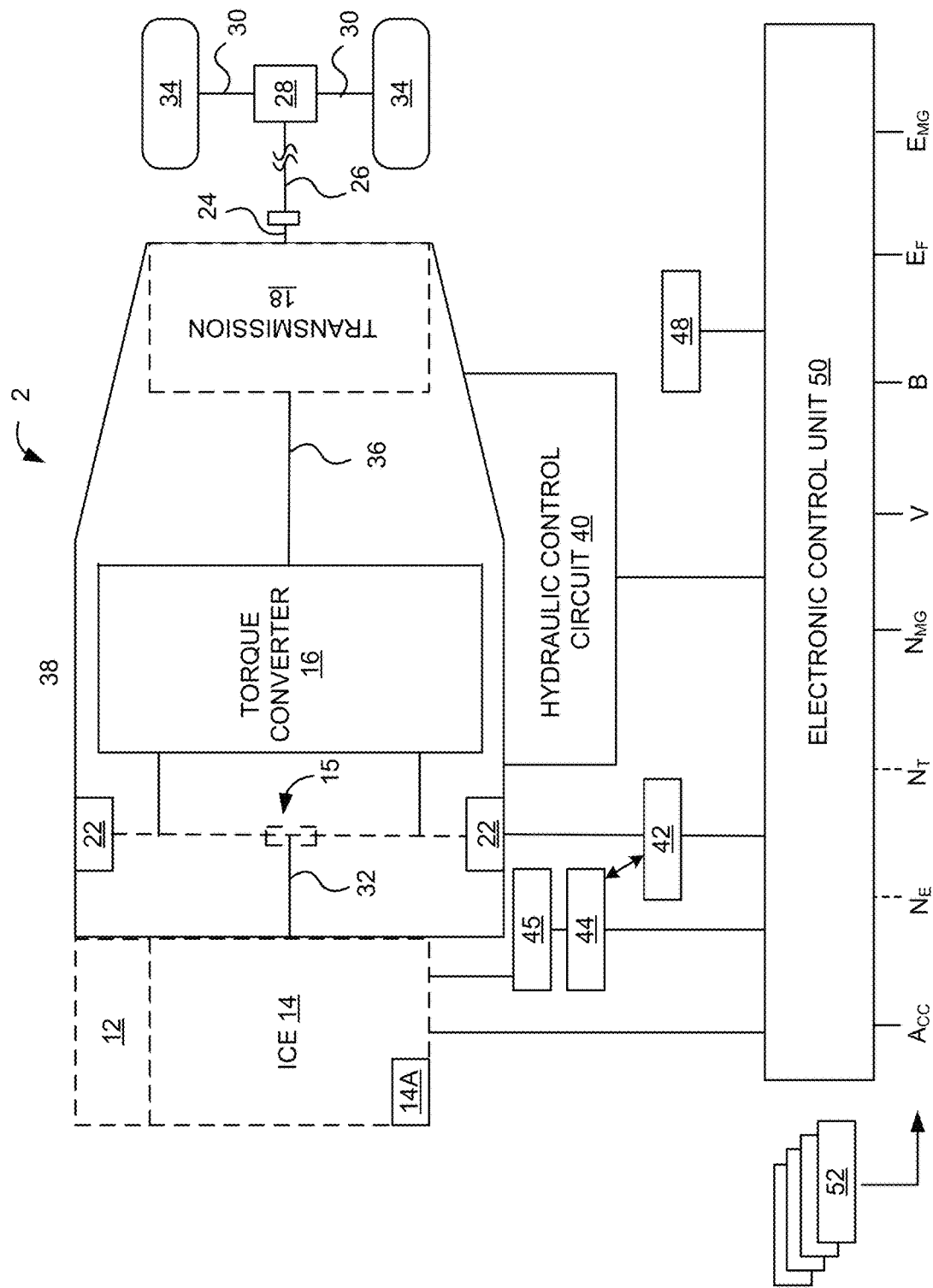
FIG. 1 is a schematic representation of an example hybrid vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the in-wheel motor can be implemented in other types of vehicle including gasoline- or diesel-powered vehicles, fuel-cell vehicles, electric vehicles (EVs), or other vehicles. Because the in-wheel motor is powered by electricity, it is well-suited to EV and HEV vehicles which commonly use electric motors for motive force.

FIG. 1 illustrates a drive system of a vehicle 102 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Motor 22 can be implemented as an in-wheel motor in accordance with the technology disclosed herein. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MS}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
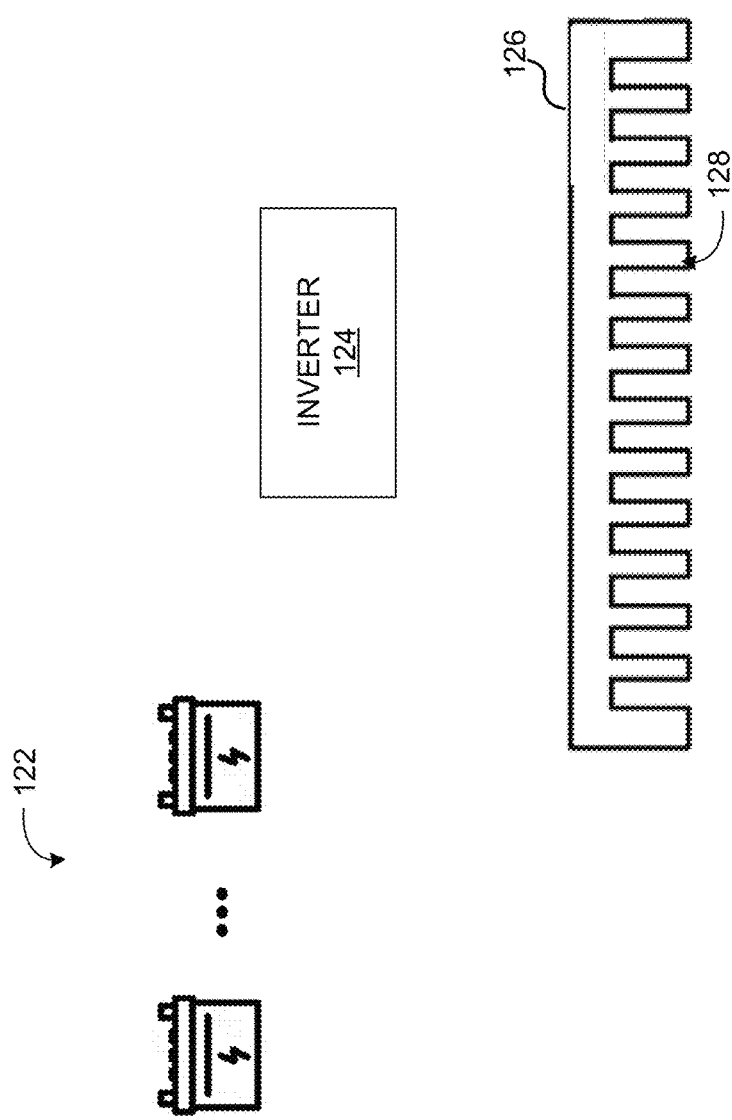
FIG. 2 is an example high-level system used to drive and in-wheel motor or steering mechanism in accordance with one embodiment.

FIG. 2 illustrates a high level example system for energizing a stator in accordance with one embodiment. In this example, a power source 122 may include one or more batteries, generators, fuel cells, photovoltaic cells or other power sources. Batteries may include any battery chemistry or configuration including, for example, lead-acid batteries, nickel cadmium (NiCad) batteries, nickel metal hydride batteries, lithium ion (Li-ion) batteries, Li-ion polymer batteries, zinc-air batteries, molten salt batteries, capacitors (e.g., parallel plate capacitors) and other energy storage devices. In some implementations, battery storage capacity may be within the 18 to 100 kWh capacity range. Although not illustrated, batteries may also include charge/discharge control circuits that rely on measurement signals from sensors, including temperature sensors voltmeter's, ammeters or other sensors. The control circuit can be used to determine charge capacity or state of charge and control the charge/discharge of the batteries. Where the power source is a non-battery source, one or more batteries may still be included to store power and provide a reservoir of available power.

The example in FIG. 2 also includes a stator 126. Stator 126 includes a plurality of coils 120. Each coil 128 includes a core wound with calls of wire such that a magnetic field is set up proximate to the coils when a current flows through the coils. Accordingly, coils 128 form electromagnets. The magnetic field is at right angles to the generator field in the coil in these magnetic fields can be directed toward the rotor (not illustrated in FIG. 2). When the coils 128 are energized using an alternating current (AC) waveform, the magnetic field reverses direction with the reversal of current flow through the coils 128. The motor may be configured to operate using multiple phases (e.g., 2-phase, 3-phase, 6-phase, etc.) of an AC waveform produced by inverter 124 (an example of which is discussed below). Coils 128 are energized in groups, based on the phases (e.g., group 141 phase, group 2 for another phase, and so on, depending on the number of phases). Coils 128 may be energized in a sequence selected to produce a magnetic field that moves relative to the rotor.

The example in FIG. 2 also includes an inverter 124. One or more inverters may be included to convert DC (direct current) power from power source 122 (in embodiments where power source 122 outputs DC power) into AC (alternating current) power to energize coils 128 of stator 126. The inverter is configured to receive a DC waveform from power source 122 (e.g. one or more batteries) and convert this waveform into an output AC waveform. Some embodiments may include both an input converter and an output converter as well as an active filter. For example, an input converter may be used to convert the input DC waveform to $2^{nd}$ DC waveform that may be used internal to the inverter; and the output converter used to convert the $2^{nd}$ DC waveform to the desired output AC waveform at a desired frequency.

Inverter 124 may also be configured to include a first inverter circuit and a transformer. The first inverter circuit may be electrically coupled to power source 122 on the one hand and a primary winding of the transformer on the other hand, and may be configured to convert the DC waveform into a first AC waveform. The transformer may then be configured to convert the AC waveform at a first frequency to an AC waveform at a desired $2^{nd}$ frequency as may be appropriate for operation of the in-wheel motor.

In some embodiments, the output AC waveform is a two-phase or three-phase (or higher) AC signal provided to coils 128 of stator 126 such that one of the phases is provided to a first coil 128 an each set of coils, the $2^{nd}$ phase to the $2^{nd}$ coil 128 in the sets of coils, ⅓ phase is provided to a third coil 128 in each of the sets of coils, and so on. Inverter 124 may also include a controller that can be configured to control the frequency, phase and magnitude of the output AC waveform. For example, the controller can be used to control the frequency with which each phase is output, thus controlling the speed with which the generated magnetic field travels along the stator.

Figure 3:
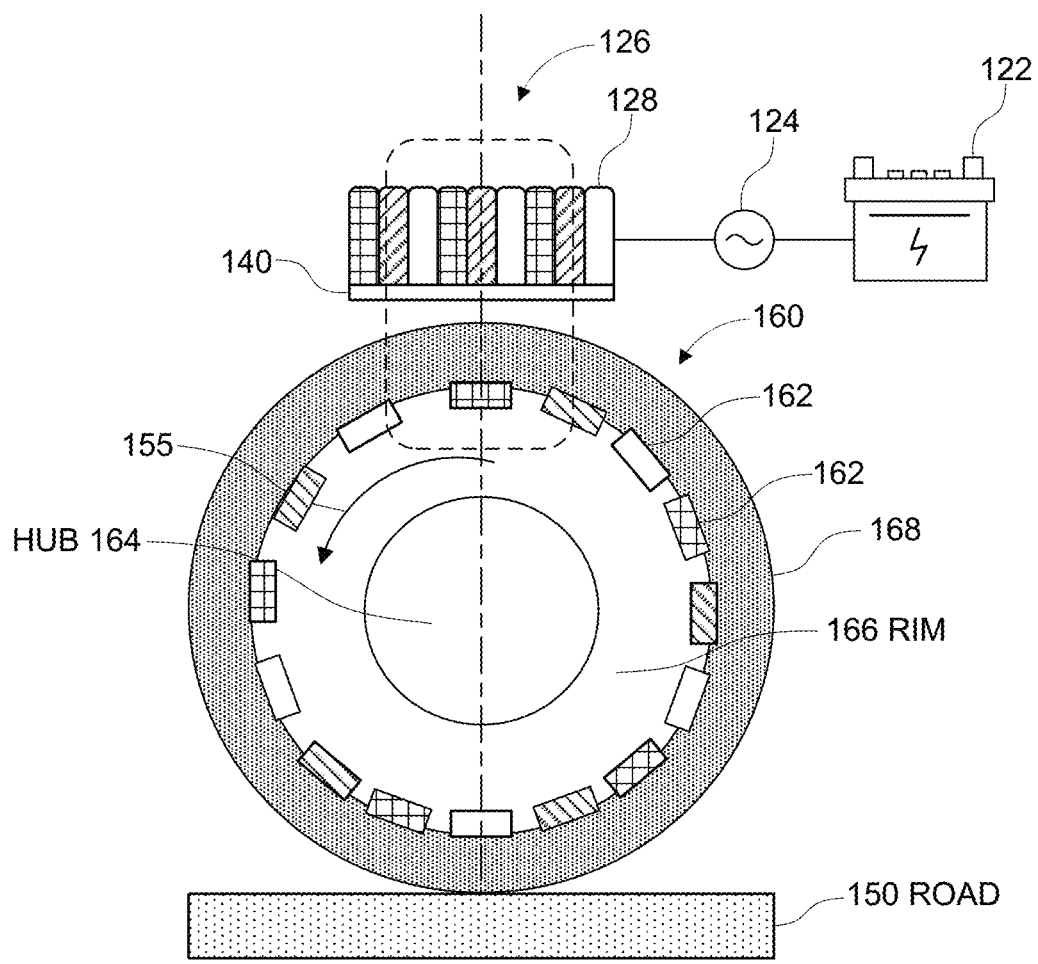
FIG. 3 illustrates an example in wheel motor system in accordance with one embodiment.

FIG. 3 illustrates the power source and stator configuration illustrated in FIG. 2 in one example implementation. In this example implementation, stator 126 and its associated coils 128 are mounted on a mounting bracket 140 and positioned external to and above a wheel 160. Stator 126 can be mounted, for example, within the wheel well, on the shock tower, or otherwise external to but proximal to the wheel. By positioning the stator 126, including the coils 128, which are made up of wire wound cores, off of the wheel, this reduces the unsprung weight of the in-wheel motor.

Further in this example, wheel 160 includes a rim 166 surrounding a hub 164 and a tire 168 mounted on rim 166. A ring of a plurality of magnets 162 are positioned about the circumference of rim 166 forms the rotor of the in-wheel motor. Magnets 162 are depicted in this example as being in an alternating configuration of north/south facing polarities. For example, every other magnet has its north pole facing outwards and the magnets positioned in between those magnets have their south poles facing outwards. Magnets 162 can be mounted in a ring along the inner or outer circumference of rim 166. In some embodiments, magnets 162 can be mounted directly to the rim such as by adhesive or mechanical fasteners. In other embodiments, magnets 162 can be mounted on a mounting structure, which can then be mounted to rim 166. Such a mounting structure can be a ringlike structure which itself can be fastened to the rim using chemical or mechanical attachment mechanisms. This mounting ring can be made from various materials including, for example, steel, stainless steel, aluminum, magnesium, copper, phenolic, plastics, elastomers, polymers, carbon fibers or other suitable materials.

A mechanical fastener may include any mechanical fastening arrangement, including those utilizing complementary interlocking or mating components releasably join two parts. Mechanical fasteners may include, for example, screws, bolts, rivets, clasps, clamps, clips, tabs, VELCRO, and so on. Chemical fasteners may include, for example, wet or dry adhesives, glues, tapes such as double or single sided tapes, etc.

As noted above, stator 126 in this example is mounted external to the wheel 160, such as at the vehicle chassis or wheel well. Although stator 126 in this example is illustrated as being above the wheel, in other embodiments stator 126 may be positioned forward or aft of the wheel or at another location proximal to the wheel. In embodiments where stator 126 is also used as a steering mechanism for the vehicle, stator 126 is preferably positioned above the wheel.

Stator 126 is positioned proximate to the rotor. Particularly, stator 126 is positioned proximate to an outer edge of the ring of the plurality of magnets. By proximate, it is meant that stator 126 is positioned close enough to the near edge of the rotor ring of magnets so that the magnetic forces of the coils in the stator and the nearest magnets in the rotor can interact with sufficient attractive forces to cause the desired effect in the wheel—either motive traction, steering or both.

As also noted above, an alternating current induced in coils 128 of stator 126 are used to generate a magnetic field. The purpose of this magnetic field is to interact with magnets 162 on rim 166 to cause rotation of wheel 160 about its central axis (e.g., about the axle) in the direction of arrow 155, or in the reverse direction.

In operation, the coils 128 and are energized by AC current provided by inverter 124 to produce a magnetic field. As noted above, the AC waveform is delivered to coils 128 in a phased manner in groups or sets of coils such that the magnetic field generated by coils 128 effectively travels along the length of stator 126. This magnetic field interacts with the magnetic fields of magnets 162 to cause the wheel to rotate about its central axis.

Figure 4:
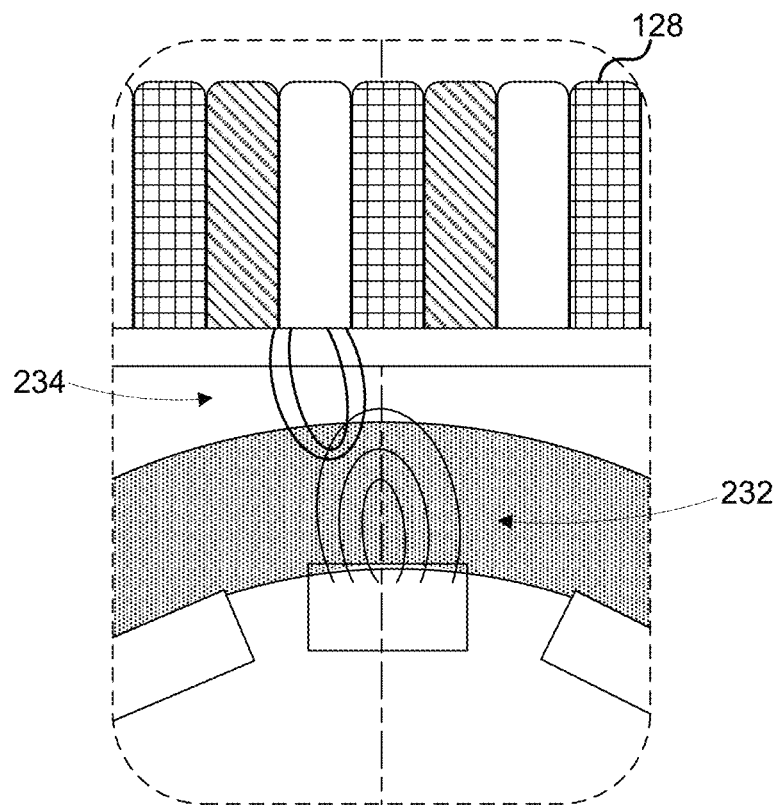
FIG. 4 illustrates an example of an interaction between magnetic fields of coils in a stator and magnets in a rotor in accordance with one embodiment.

FIG. 4 illustrates an example of magnetic fields generated by coils of a stator and magnets of a rotor in accordance with one embodiment. In this example, magnetic field 234 generated by coil 128 interacts with magnetic field 232 generated by magnet 162. As each respective coil in a set of coils is energized and the resultant magnetic field 234 moves down the line this has the effect of pulling a respective magnet 162 along, causing the wheel to rotate. In some embodiments, the strength of the magnetic field can be constant for all coils 128 in the plurality of coils. In other embodiments, the strength of the magnetic field can vary from coil to coil. For example, in some embodiments, the strength of the current or the coil configuration can be adjusted such that the magnetic field is greater for coils 128 at the outer ends of stator 126 and weaker for coils 128 in the center of stator 126. This can allow, for example, the magnetic field from the outer coils 128 to achieve a farther reach to interact with magnets that are farther away from the stator due to the curvature of the rim 166. The system can be configured such that field strength varies in two or more sectors (e.g. ends, center) of stator 126. In other embodiments, the system be configured such that the field strength varies for each coil, each set of coils or for groups of two or more sets of coils.

As this diagram suggests, the distance at which stator 126 can be mounted from magnets 162 depends on the strength of the magnetic field generated by coils 128, or the magneto motive force of the coil. The strength of the magnetic field, usually expressed in ampere-turns/meter depends in part on the magnitude of the AC waveform provided to coils 128, the material out of which the core is made and the number of turns of wire around the coil. Another factor when considering mounting distances between the stator and rotor is the degree of spread that might be expected in the magnetic fields over given distances.

The physical distance between the stator and the magnets can be calculated as:

$$D_{TOT}=D_W+D_T+D_V,$$

Where $D_{TOT}$ is the total distance from the stator coils to the farthest magnet with which the magnetic field needs to interact, $D_W$ is the distance from the outermost edge of the magnet to the outer edge of the wheel rim, $D_T$ is the distance from the wheel edge to the outer surface of the tire, and $D_V$ is the remaining distance from the outer edge of the tire to the vehicle. These individual distances can be important in calculating the remaining strength of the magnetic field as it travels from the stator to the rotor because the amount of degradation in the field will vary depending on the permeability of the materials through which it travels.

Returning now to FIG. 3, in this example coils 128 are mounted on a mounting bracket 140 of stator 160. Mounting bracket 140 can be the armature on which coils 128 are mounted or can be a separate mounting bracket to hold the coil assembly and attach it to the vehicle. In this example, mounting bracket 140 is between coils 128 and magnets 162. Accordingly, in such embodiments it is preferable to provide a mounting bracket 140 that is made of a material of low magnetic permeability so as to reduce or minimize interference with magnetic fields (e.g. magnetic fields 234). In other embodiments, this stator assembly can be mounted 180° from the orientation illustrated in FIG. 3 such that mounting bracket 140 is not interposed between coils 128 and magnets 162.

Figure 5:
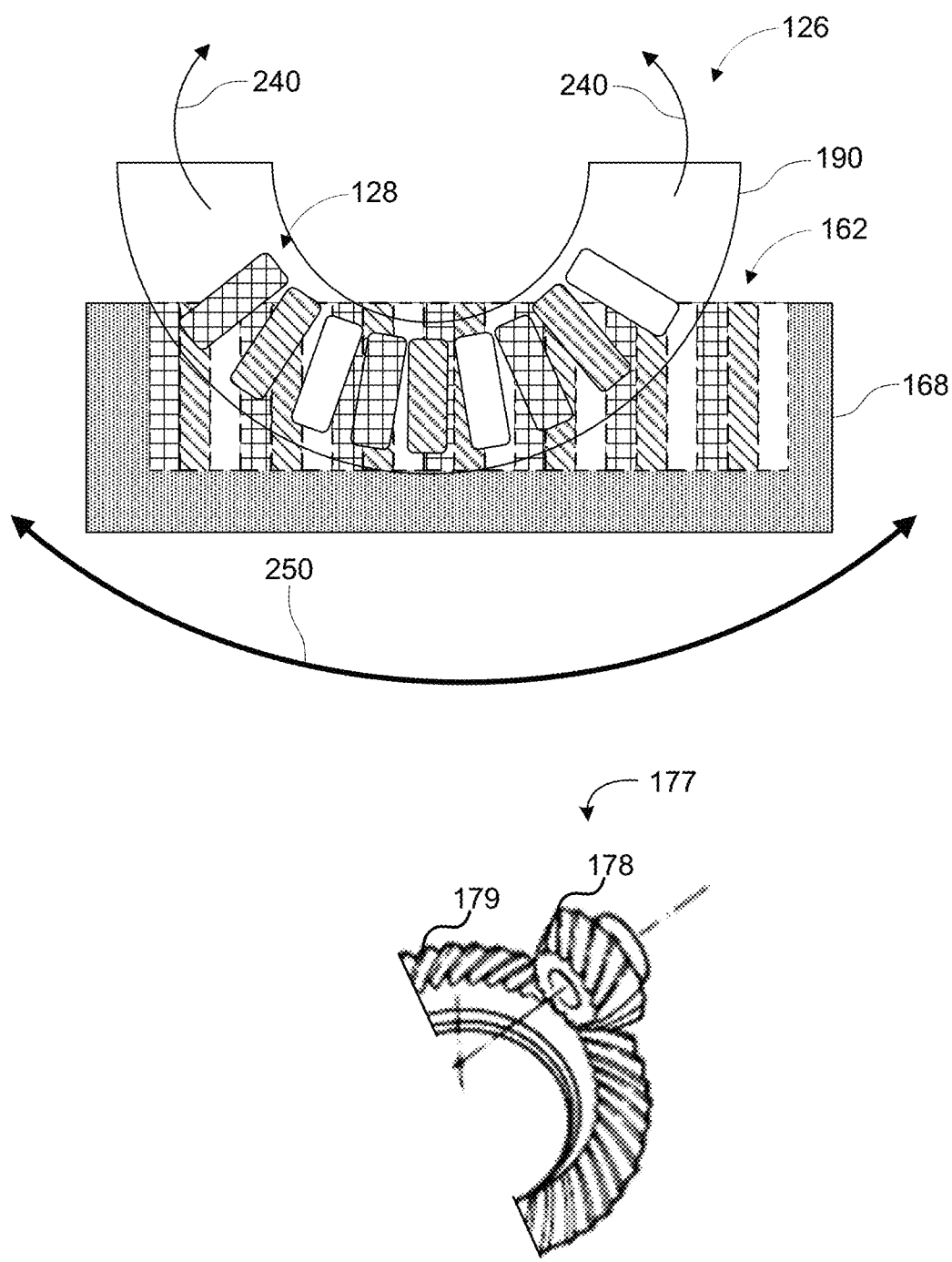
FIG. 5 illustrates an example using a stator and rotor to steer a wheel of a vehicle in accordance with one embodiment.

FIG. 5 illustrates an example using a stator assembly to not only provide motive force to the wheel, but to also steer the wheel. In this example, stator 162 is mounted on a mounting plate that is configured to rotate about a stator axis as illustrated by arrows 240. This rotation is in a plane substantially perpendicular to the plane of rotation of the wheel 168 of a moving vehicle. In various embodiments, the system can be configured to induce a current through coils 128 to induce a magnetic field (e.g., as described above with reference to FIGS. 3 and 4), but in this example the coils 128 are arranged in a radial configuration. Rotation of the coil arrangement (e.g. in the direction of arrows 240) causes magnets 162 in the rotor to follow the curvature, thus turning the wheel as illustrated by arrow 250. Particularly, in some embodiments, rotation of the coils about an axis perpendicular to the axis of rotation of the wheel translates the magnetic field of the coils rotationally and magnetic forces of attraction between the rotationally translated magnetic field of the coils and the magnetic field of the magnets in the rotor induces rotational translation of the wheel about a second axis perpendicular to the axis of rotation of the wheel to steer the vehicle.

A drive member such as a shaft (not shown) can be used to drive the rotation of stator 126 to the desired degree of rotation in directions 240. The drive member can include a shaft and appropriate mating gears or other linkages to link the shaft to mounting component 190 in steering components of the vehicle. For example, the shaft may include a pinion gear or other cylindrical or semi-cylindrical gear at or near the end of the shaft. The stator mounting plate can include an elongated mating gear disposed thereon or attached thereto. The rack may be curved to match the curvature of the arrangement of stator coils 128. Accordingly, the pinion gear may mesh with the elongated mating gear such that rotation of the pinion gear in either direction causes stator 126 to rotate in the corresponding directions indicated by arrows 240. The pinion gear and the gear rack can include, for example, spiral gears, helical gears, bevel gears, etc. An example of a spiral bevel gear configuration that can be used to rotate stator 126 is illustrated at 177 with a spiral bevel pinion gear 178 meshing with phase spiral bevel rack gear 179. In yet another example, a worm gear can be included at or near the end of the shaft to mesh with a meeting worm gear about the outer perimeter of mounting component 190.

In the example illustrated in FIG. 5, the mounting component 190 upon which coils 128 are mounted is a substantially planar, semicircular member sufficiently rigid to hold the coils in place and respond to rotational forces used to rotate the member to effectuate steering. Mounting component 190 can be made using any of a number of suitably strong, rigid materials including, for example, steel, stainless steel, titanium, brass, bronze and other alloys. Mounting component 190 may also comprise nonmetallic members such as, for example, polyvinyl chloride or other polymers, ABS, laminate structures and so on.

Although the examples illustrated are shown with example quantities of coils 128 and magnets 162, other quantities of coils 128 and magnets 162 can be used depending on the implementation. Quantities of magnets 162 will depend, for example, on the circumference of the rim on which they are placed in the desired spacing between the magnets. Size of the magnets will also be a factor. Similarly, the quantity of coils 128 included with a stator 126 will depend on the overall length of the stator, spacing between the coils and coil dimensions. The length of the stator depends on the desired reach of the magnetic field of the coils around the circumference of the rim.

Figure 6:
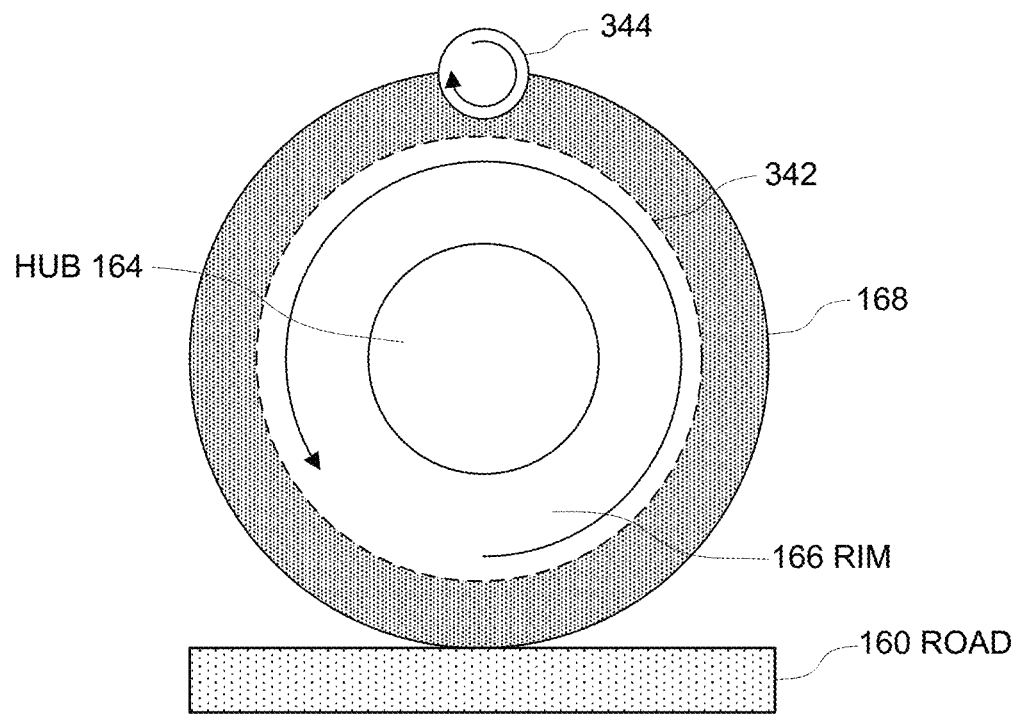
FIG. 6 illustrates an example of a mechanical drive system in accordance with one embodiment.

FIG. 6 illustrates a mechanical embodiment that uses gears instead of coils to provide force cause tractive motion of the wheel. In this example, the coils are replaced by a pinion gear 344 and the rotor containing magnets is replaced by a bevel gear 342 around the circumference of the wheel rim to mesh with the drive pinion gear. In operation, a drive motor or other source of rotational energy causes pinion gear 344 to rotate about its axis. Rotation of pinion gear 344 causes counter rotation in the driven bevel gear 342 causing tractive motion of the wheel.

Figure 7:
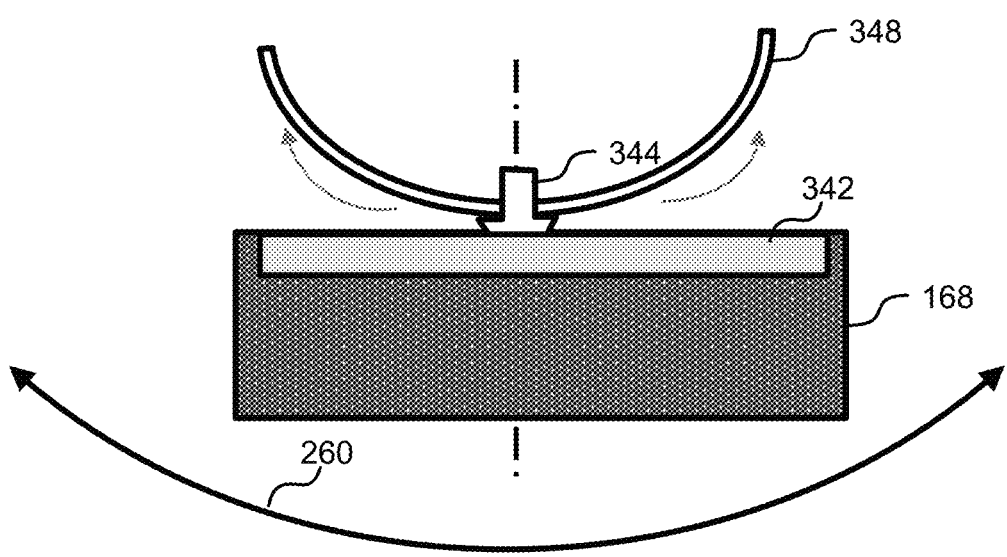
FIG. 7 illustrates an example mechanical drive system of FIG. 5 to steer a wheel of a vehicle in accordance with one embodiment.

FIG. 7 illustrates an example of using the mechanical embodiment of FIG. 6 to also provide steering for the vehicle. In this example, drive pinion 344 is mounted on a structure 348 such as a track or other structures. Movement of drive pinion 344 along the path defined by rotatable structure 348 causes the wheel to rotate as illustrated by arrow 260. In some embodiments, this may be implemented as an electric machine mounted on a semi-circular plate or rail that itself can be rotated. This mechanical embodiment may include a pinion gear disposed on or within drive pinion 344 that meshes with a rack here disposed on structure 348. An alternative embodiment may include a second pinion gear at the opposite end that is sandwiched between two other ring gears. The top ring gear could provide motive torque in its rotation, while the bottom could facilitate turning. If it rotates along with the upper ring gear, the drive pinions don't move for steering. If the bottom is slower or faster than the upper pinion, some steering rotation in the corresponding direction would be generated.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A drive mechanism of a vehicle, comprising:
a rotor comprising a ring of a plurality of magnets located about a circumference of a rim of a wheel of the vehicle, the plurality of magnets generating a first magnetic field;
a stator comprising a plurality of coils, the stator mounted to a body of the vehicle as sprung mass located outside the wheel of the vehicle and proximate to an outer edge of the ring of the plurality of magnets; and
wherein the plurality of coils of the stator, when energized by an AC waveform, generate a second magnetic field stator, and further wherein an interaction between the first and second magnetic fields creates an attractive force causing tractive motion of the wheel about an axis of rotation of the wheel.

2. The drive mechanism of claim 1, wherein the coils of the stator are arranged radially about and rotatable in a plane perpendicular to the plane of rotation of the wheel.

3. The drive mechanism of claim 2, wherein rotation of the stator causes rotation of the wheel about an axis perpendicular to a road surface on which the wheel is traveling.

4. The drive mechanism of claim 1, wherein the second magnetic field generated by coils of the stator at end portions of the stator is stronger than the second magnetic field generated by coils of the stator at a center portion of the stator.

5. The drive mechanism of claim 4, wherein for a given rotational orientation of the wheel, each set of coils is aligned with a corresponding magnet of the rotor at a determined distance and the strength of the second magnetic field generated by a coil in a set of coils is of a magnitude at least strong enough to cause sufficient attraction of its corresponding magnet to cause the attractive forces to contribute to rotational movement of the wheel.

6. The drive mechanism of claim 1, wherein:
the stator is mounted above the wheel of the vehicle in a wheel well of the vehicle and the coils of the stator are disposed radially on a mounting member in sets of two or more coils;
the drive mechanism further comprises a rotatable shaft coupled to engage the mounting member such that rotation of the rotatable shaft causes rotation of the mounting member and the coils disposed thereon about a first axis perpendicular to the axis of rotation of the wheel; and
rotation of the coils about the axis perpendicular to the axis of rotation of the wheel translates the second magnetic field rotationally and magnetic forces of attraction between the rotationally translated second magnetic field of the coils and the first magnetic field of the magnets induces rotational translation of the wheel about a second axis perpendicular to the axis of rotation of the wheel to steer the vehicle.

7. The drive mechanism of claim 6, wherein the coils of the stator comprise a plurality of adjacent sets of three-phase AC windings and the magnets of the rotor are arranged this alternating north/south pole permanent magnets.

8. The drive mechanism of claim 6, wherein the second magnetic field generated by coils of the stator at end portions of the stator is stronger than the second magnetic field generated by coils of the stator at a center portion of the stator.

9. The drive mechanism of claim 8, wherein for a given rotational orientation of the wheel, each set of coils is aligned with a corresponding magnet of the rotor at a determined distance and the strength of the second magnetic field generated by a coil in a set of coils is of a magnitude at least strong enough to cause sufficient attraction of its corresponding magnet to cause the attractive forces to contribute to rotational movement of the wheel.

10. The drive mechanism of claim 1, wherein the stator is mounted in the wheel well above the wheel of the vehicle.

11. The drive mechanism of claim 1, wherein the stator is mounted in the wheel well fore or aft of the wheel of the vehicle.

12. The drive mechanism of claim 1, further comprising a DC power source and an inverter, the inverter having an input coupled to the DC power source and an output coupled to the stator, wherein the inverter is configured to convert a DC waveform from the DC power source into an AC waveform to drive the coils of the stator.

13. The drive mechanism of claim 12, further comprising a controller to control at least one of the phase, frequency and magnitude of the AC waveform.

14. A drive mechanism of a vehicle, comprising:
a rotor comprising a ring of a plurality of magnets located about a circumference of a rim of a wheel of the vehicle, the plurality of magnets generating a first magnetic field; and
a stator comprising a plurality of coils, the stator mounted to a body of the vehicle, and located outside the wheel of the vehicle and proximate to an outer edge of the ring of the plurality of magnets; wherein the plurality of coils of the stator are arranged radially about and rotatable in a plane perpendicular to the plane of rotation of the wheel; and
wherein rotation of the stator causes rotation of the wheel about an axis perpendicular to a road surface on which the wheel is traveling; and
wherein the plurality of coils of the stator, when energized by an AC waveform, generate a second magnetic field stator, and further wherein an interaction between the first and second magnetic fields creates an attractive force causing tractive motion of the wheel about an axis of rotation of the wheel.

15. The drive mechanism of claim 14, wherein the second magnetic field generated by coils of the stator at end portions of the stator is stronger than the second magnetic field generated by coils of the stator at a center portion of the stator.

16. The drive mechanism of claim 15, wherein for a given rotational orientation of the wheel, each set of coils is aligned with a corresponding magnet of the rotor at a determined distance and the strength of the second magnetic field generated by a coil in a set of coils is of a magnitude at least strong enough to cause sufficient attraction of its corresponding magnet to cause the attractive forces to contribute to rotational movement of the wheel.

17. A drive mechanism of a vehicle, comprising:
a rotor comprising a ring of a plurality of magnets located about a circumference of a rim of a wheel of the vehicle, the plurality of magnets generating a first magnetic field; and
a stator comprising a plurality of coils, the stator mounted to a body of the vehicle, and located outside the wheel of the vehicle and proximate to an outer edge of the ring of the plurality of magnets;
wherein the stator is mounted in a wheel well of the vehicle above the wheel of the vehicle; and
wherein the plurality of coils of the stator, when energized by an AC waveform, generate a second magnetic field stator, and further wherein an interaction between the first and second magnetic fields creates an attractive force causing tractive motion of the wheel about an axis of rotation of the wheel.

18. The drive mechanism of claim 17, wherein the coils of the stator are arranged radially about and rotatable in a plane perpendicular to the plane of rotation of the wheel.

19. The drive mechanism of claim 18, wherein rotation of the stator causes rotation of the wheel about an axis perpendicular to a road surface on which the wheel is traveling.

20. The drive mechanism of claim 17, wherein the second magnetic field generated by coils of the stator at end portions of the stator is stronger than the second magnetic field generated by coils of the stator at a center portion of the stator.

21. The drive mechanism of claim 20, wherein for a given rotational orientation of the wheel, each set of coils is aligned with a corresponding magnet of the rotor at a determined distance and the strength of the second magnetic field generated by a coil in a set of coils is of a magnitude at least strong enough to cause sufficient attraction of its corresponding magnet to cause the attractive forces to contribute to rotational movement of the wheel.

22. A drive mechanism of a vehicle, comprising:
a rotor comprising a ring of a plurality of magnets located about a circumference of a rim of a wheel of the vehicle, the plurality of magnets generating a first magnetic field; and
a stator comprising a plurality of coils, the stator mounted to a body of the vehicle, and located outside the wheel of the vehicle and proximate to an outer edge of the ring of the plurality of magnets;
wherein the stator is mounted in a wheel well of the vehicle fore or aft of the wheel of the vehicle; and
wherein the plurality of coils of the stator, when energized by an AC waveform, generate a second magnetic field stator, and further wherein an interaction between the first and second magnetic fields creates an attractive force causing tractive motion of the wheel about an axis of rotation of the wheel.

23. The drive mechanism of claim 22, wherein the coils of the stator are arranged radially about and rotatable in a plane perpendicular to the plane of rotation of the wheel.

24. The drive mechanism of claim 23, wherein rotation of the stator causes rotation of the wheel about an axis perpendicular to a road surface on which the wheel is traveling.

25. The drive mechanism of claim 22, wherein the second magnetic field generated by coils of the stator at end portions of the stator is stronger than the second magnetic field generated by coils of the stator at a center portion of the stator.

26. The drive mechanism of claim 25, wherein for a given rotational orientation of the wheel, each set of coils is aligned with a corresponding magnet of the rotor at a determined distance and the strength of the second magnetic field generated by a coil in a set of coils is of a magnitude at least strong enough to cause sufficient attraction of its corresponding magnet to cause the attractive forces to contribute to rotational movement of the wheel.

\* \* \* \* \*